Aug. 16, 1932.                J. GAYAN                    1,871,980
                     SAFETY HANGER FOR BRAKE BEAMS
                     Original Filed April 28, 1931
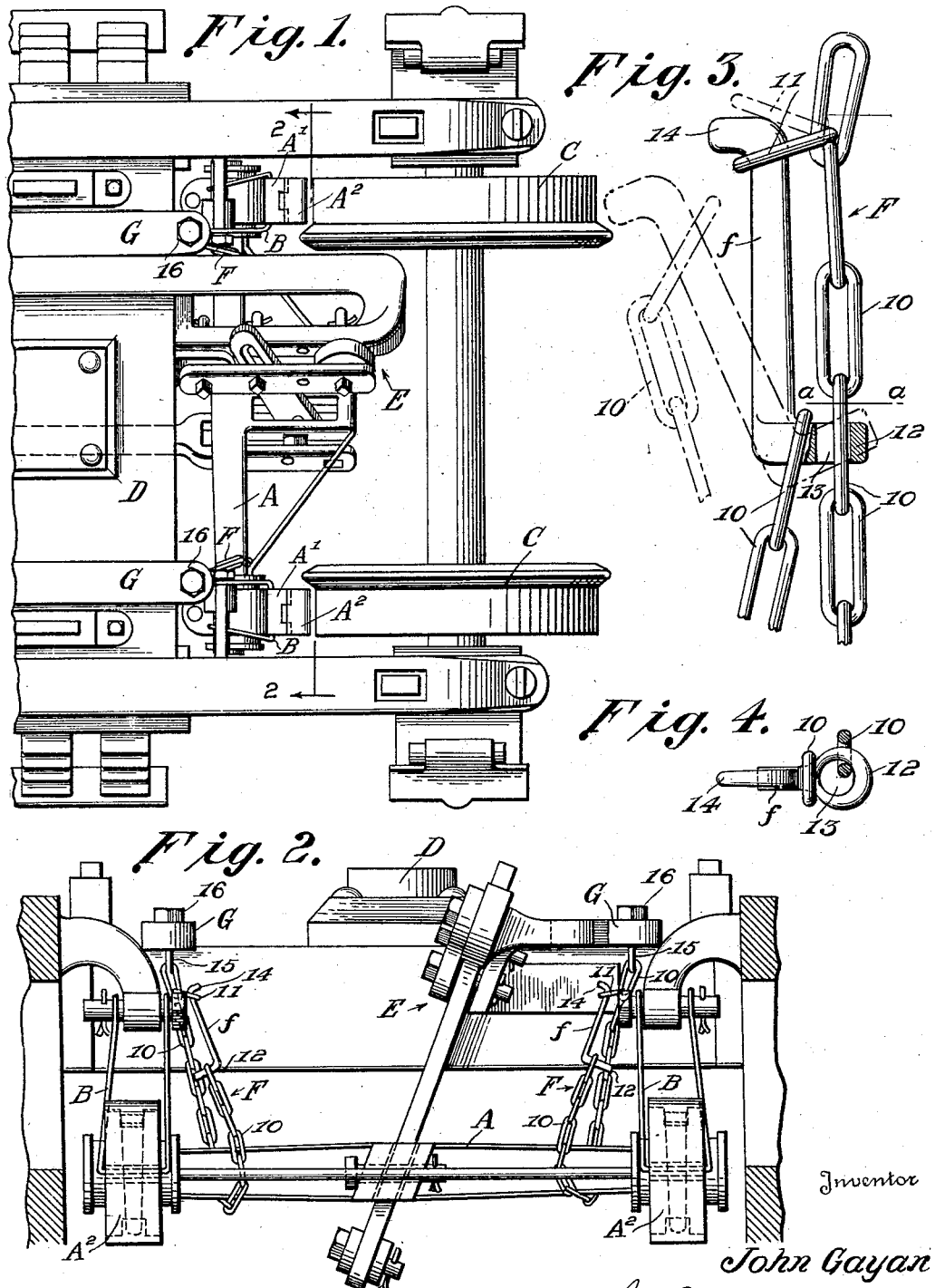

Patented Aug. 16, 1932

1,871,980

UNITED STATES PATENT OFFICE

JOHN GAYAN, OF BALTIMORE, MARYLAND

SAFETY HANGER FOR BRAKE BEAMS

Original application filed April 28, 1931, Serial No. 533,512. Divided and this application filed June 16, 1932. Serial No. 617,665.

This application is a division of my application for Letters Patent of the United States filed in the U. S. Patent Office on April 28, 1931 for certain improvements in braking systems and numbered, serially, 533,512.

It is well understood by those familiar with railway car and locomotive trucks that each brake beam thereof is supported at its opposite ends by a pair of hangers—hereinafter referred to as "main hangers"—and that breakage of any of these hangers is of frequent occurrence and is attended with disastrous results, since it permits the corresponding end of the brake beam to fall onto the track and frequently tears up the road-bed and sometimes results in derailment of the car.

The primary purpose of this invention is to provide a means of simple and practicable nature which, without interfering with the movements of the beam in setting or releasing the brakes and without essentially or even preferably bearing any substantial part of the weight of the beam when the main hangers are operative, will bear such relationship to the beams as to effectively support the latter in operative relation with the brake mechanism and car wheels in the event that any one of the main hangers becomes broken.

The means referred to comprise a set of safety hangers which are supplemental to the "main hangers": and it is a further purpose of this invention to so construct each safety hanger that it may be readily and quickly applied in a selected position in relation to the truck and beam, including easy and quick adjustment thereof to best suit the requirements in relation to any given brake beam.

In the accompanying drawing I have illustrated, and will hereinafter describe in detail, the preferred construction of my safety hangers, but it should be understood that said construction is merely exemplary and that changes in the details may be made without departing from the spirit of the appended claims. In said drawing, wherein like characters of reference denote corresponding parts in the several views:

Fig. 1 is a plan view of one end of a car truck having a pair of my safety hangers respectively connected thereto in position to be engaged by and to support the corresponding ends of the brake beam in the event that either or both of the main hangers become broken or are otherwise rendered ineffective;

Fig. 2 is a vertical section on the line 2—2 of Fig. 1;

Fig. 3 is a side elevation of one of the safety hangers, on a larger scale than the preceding figures, and shows in full lines certain links of the hanger connected with each other in the position they occupy when the hanger is arranged in operative relation with the corresponding end of the beam, and also shows in dot-and-dash outline said links disconnected from each other, as when applying the hanger to, or removing it from, the beam, or in adjusting its length to best serve the particular beam with which it is to operate; and Fig. 4 is a view, partially in plan and partially in section, of the parts of the hanger shown in Fig. 3, the section being through one of the links as indicated by the line $a$—$a$ on Fig. 3.

The brake beam, designated as a whole by the letter A; the brake blocks $A^1$ at opposite ends of said beams and the shoes $A^2$ carried by said blocks; the main hangers B for the supporting opposite ends of said beam; the wheels C; the truck bolster D; and the brake setting and releasing means, designated as a whole by the letter E: are all of the usual or any suitable construction and form no essential part of the instant invention which, as hereinbefore suggested, relates to the safety hangers, respectively marked F in Figs. 1 and 2. It may be mentioned, however, that the particular parts of the brake setting and releasing mechanism shown in Figs. 1 and 2 are similar in construction to the corresponding parts shown, described and claimed in my aforesaid application for patent (Ser. No. 533,512) and for that reason and also because my safety hangers are not essentially employed on a truck which also has said mechanism, it is not necessary to set forth said brace setting and releasing mechanism herein. However, I prefer to employ both my improved brake setting and releasing mechanism and my safety hangers as parts of the same braking systems, since full assurance against any of the hazards resulting from the bending or breaking of the lever guides forming parts of such systems and breaking of the hangers which support the brake beams, is thereby obtained.

Each safety hanger F comprises a chain of strong construction and of such length that it may form a loop or saddle extending loosely around the lower side of the beam and upward therefrom. 10 designates the links of the chain. The link at one end of the chain is secured to the truck bolster, as hereinafter more fully described, and a connector f also of strong and durable construction, is provided to connect a link of the ascending side of the chain to one of the links of the descending side through the medium of an appropriate element, as a link 11, for example, with which the upper end of the connector is removably engageable. Said connector has its lower end formed with a foot piece 12 which extends laterally therefrom and is formed with an opening 13. An appropriate link of the descending side of the chain has one of its sides extending through said opening 13, said link being closed about the foot piece 12 and thereby secured to the connector in a substantially permanent manner. Said foot piece 12 is also adapted to extend removably through any one of the links of the ascending side of the chain. The upper end of the connector, as already stated, extends through the link 11 and is provided with a laterally projecting head 14 by which it is held in engagement with said link. Hence, the two sides of the chain are firmly connected with each other by a device which has a two-point connection with the descending side of the chain and upon which a link of the ascending side of the chain rests when the chain has been passed loosely around the lower side of the corresponding end of the brake beam. Hence, the chain is capable of forming an effective support for said end of the brake beam immediately upon breakage of the corresponding main hanger B.

The upper link of the descending side of the chain is secured in any appropriate manner to the bolster. As here shown, the bolster is provided for this purpose with a bar G which is firmly secured thereto and projects at one end beyond the side thereof and an eye-bolt 15, secured to the upper link of the chain, extends through the projecting end of said bar and is secured thereto by a nut 16.

It will be noticed that the connection of the foot piece 12 with the chain is such as to permit pivotal movement of the connector F relatively to said chain in the operation of connecting the two sides of the chain with or disconnecting them from, each other: and it will be understood that the upper end of the connector may be readily freed from the link 11 by slipping its head 14 out of engagement with said link 11 and that when said end of the connector is free from the link 11 any selected link 10 of the part of the chain which has been passed about the brake beam may be slipped over said head and down upon the foot piece 12, and also that the link previously mounted on said foot piece may be slipped off the connector over the head 14 of the latter. It will be evident, therefore, that in connecting the two sides of the chain with each other, the link of the ascending side to be supported by the foot piece 12 is slipped over the free end of the connector and down onto said foot piece, and that the head 14 of the connector is then slipped through the link 11, thereby completing the connection. In disconnecting the two sides of the link from each other the head of the connector is disconnected from the link 11, whereupon the link of the ascending side of the chain mounted upon the foot piece of the connector may be slipped off said foot piece. Thus, it will be seen that the two sides of the chain are readily connectible with and disconnectible from, each other and that the length of the chain may be quickly and easily adjusted or readjusted.

In practice, four of these safety hangers are employed on each truck—two of the same being arranged in a suspended relation from one end of the truck bolster in positions to be engaged by opposite ends of the brake beam at said side of the truck bolster and two at the opposite end of the truck bolster in position to be engaged by opposite ends of the brake beam at the latter side of the bolster. It will also be noticed that these safety hangers do not interfere with the movements of the beam in setting and releasing the brakes and that none of them essentially carries any part of the weight of the beam until their supporting function is required by failure of the main hangers, or any of said hangers to function properly due to breakage or other cause. It will be apparent that when the weight of any beam comes upon the corresponding safety hanger or hangers the chain or chains of the latter are tightened. Finally, it will be apparent that these hangers may be readily applied to a car truck which has been in use as well as in the original construction of the truck.

Having thus described the invention what I believe to be new and desire to secure by Letters Patent, is:

1. A safety hanger for a brake beam of a railway car truck, comprising a chain adapted to extend loosely around the lower side of the brake beam and whose upper end is provided with means for attaching it to an appropriate part of the truck and a connector loosely mounted upon one link of the chain and provided with a lateral projection adapted to extend into another link of the chain, said connector also having a second lateral projection and said chain having a laterally projecting link to receive said second projection.

2. A braking system for railway car trucks, including a brake beam, main supporting hangers for said beam and supplemental hangers effective to support the beam in operative position when the main hangers become non-effective: each supplemental hanger comprising a chain which extends loosely around the lower side of the brake beam and whose upper end is provided with means for attaching it to an appropriate part of the truck and a connector loosely mounted upon one link of the chain and provided with a lateral projection extending into another link of the chain, said connector also having a second lateral projection and said chain having a laterally projecting link to receive said second projection.

3. A braking system for railway car trucks, including a brake beam, main supporting hangers for said beam, and supplemental hangers effective to support the beam in operative position when the main hangers become non-effective: each supplemental hanger comprising a flexible member passed loosely around the lower side of the beam and an element for connecting the two sides of said member with each other after the member has been passed around the beam, said element having one of its ends connected to both of the sides of said member and its other end connected to one of said sides only.

4. A braking system for railway car trucks, including a brake beam, main supporting hangers for said beam and supplemental hangers effective to support the brake beam in operative position when the main hangers become non-effective: each supplemental hanger comprising a flexible member passed loosely around the lower side of the beam and an element which is substantially permanently connected to the portion of the member on one side of the beam and is detachably connected to the portion of said member on the other side of the beam and is also detachably connected to the portion of said member at the first mentioned side of the beam at a place spaced from its substantially permanent connection to said portion.

5. A braking system for railway car trucks including a brake beam, main supporting hangers for said beam and supplemental hangers effective to support the beam in operative position when the first mentioned hangers become non-effective: each supplemental hanger comprising a chain which is secured at one end to an appropriate part of the car truck and is of a length adapted to pass loosely around the lower side of the beam and a connector having a pivotal connection with one of the links at one side of the beam and a detachable connection with another of the links at the said side of the beam, said connector also having a member adapted to be engaged by a link of the chain at the side of the beam opposite that first-mentioned.

6. A braking system for railway car trucks including a brake beam, main supporting hangers for said beam, and supplemental hangers effective to support the beam in operative position when the main hangers become non-effective: each supplemental hanger comprising a chain which is secured at one of its ends to an appropriate part of the truck and is passed loosely around the lower side of the beam and a connector having at one end a member which engages appropriate links of the chain arranged on opposite sides of the beam and having at its opposite end a member by which it is connected to an element projecting from the portion of the chain on one side of the beam.

7. A braking system according to claim 6 in which the member at one end of the connector projects laterally from said connector and is formed with an opening through which a link of the portion of the chain at one side of the beam extends and which projection provides a foot piece to extend through a link of the chain at the side of the beam opposite that first mentioned and in which said first mentioned side of the chain is provided with a laterally extending link and the corresponding end of the connector is provided with a head to extend through the last mentioned link.

8. In a braking system for railway car trucks, a brake beam, main hangers engaging opposite ends of the brake beam, and supplemental hangers effective to support the brake beam in operative position when the first mentioned hangers become non-effective, each of said supplemental hangers including a chain comprising a series of connected links and a connector and having means for securing the upper end of the chain to an appropriate part of the truck and being of a length adapted to form a loop which receives the corresponding part of the brake beam, each connector having lateral extensions projecting in opposite directions from its ends, one of said projections forming a foot piece to extend through one link of the chain and having an opening through which another link of the chain extends, said chain also including a link to receive the projection at the end of the connector opposite the foot piece.

Signed at Washington, District of Columbia, June 16th, 1932.

JOHN GAYAN.